(12) United States Patent
Rydlewski et al.

(10) Patent No.: US 11,708,184 B2
(45) Date of Patent: Jul. 25, 2023

(54) DEVICE FOR MANUFACTURING A POUCH ACCOMMODATED IN A WRAPPING

(71) Applicant: TEEPACK SPEZIALMASCHINEN GMBH & CO. KG, Meerbusch (DE)

(72) Inventors: Thomas Rydlewski, Düsseldorf (DE); Christoph Hollenbeck, Mönchengladbach (DE); Andreas Höfle, Aschaffenburg (DE); Stefan Lambertz, Hürth (DE); Hans Knops, Krefeld (DE)

(73) Assignee: TEEPACK SPEZIALMASCHINEN GMBH & CO. KG, Meerbusch (DE)

( * ) Notice: Subject to any disclaimer, the term of this patent is extended or adjusted under 35 U.S.C. 154(b) by 0 days.

(21) Appl. No.: 17/458,066

(22) Filed: Aug. 26, 2021

(65) Prior Publication Data
US 2022/0063852 A1    Mar. 3, 2022

(30) Foreign Application Priority Data
Aug. 31, 2020    (EP) .................................. 20193603

(51) Int. Cl.
*B65B 29/02*    (2006.01)
*B65B 51/16*    (2006.01)
(Continued)

(52) U.S. Cl.
CPC ............ *B65B 29/028* (2017.08); *B65B 11/48* (2013.01); *B65B 51/10* (2013.01); *B65B 51/14* (2013.01); *B65B 51/16* (2013.01)

(58) Field of Classification Search
CPC ....... B65B 11/48; B65B 29/028; B65B 51/10; B65B 51/14; B65B 51/16; B29C 65/222;
(Continued)

(56) References Cited

U.S. PATENT DOCUMENTS 2,305,010 A * 12/1942 Kenney et al. ....... B29C 66/849
                                                    100/319
2,334,256 A * 11/1943 Eaton ..................... B65B 29/04
                                                     53/413
(Continued)

FOREIGN PATENT DOCUMENTS

CA         2331652 A1     9/1991
CN         1362924 A      8/2002
(Continued)

OTHER PUBLICATIONS

Chinese Office Action issued in CN Application No. 202010362457.2 dated Jul. 6, 2021 with English translation (15 pages).
(Continued)

*Primary Examiner* — Stephen F. Gerrity
(74) *Attorney, Agent, or Firm* — Dorsey & Whitney LLP

(57) ABSTRACT

The present invention relates to a device for manufacturing a pouch containing a brewable material accommodated in a wrapping, comprising a pouch manufacturing device adapted to manufacture a pouch containing brewable material, and a sealing station with jaw elements forming opposing sealing surfaces acting on the wrapping from opposite sides for sealing the pouch. The device according to the invention allows a more economical production of a packaging unit comprising a pouch in the wrapping and has a trough-shaped recess in which a helically laid heating conductor is accommodated.

8 Claims, 5 Drawing Sheets

(51) Int. Cl.
  *B65B 51/14* (2006.01)
  *B65B 11/48* (2006.01)
  *B65B 51/10* (2006.01)

(58) Field of Classification Search
  CPC ........ B29C 65/223; B29C 65/221–229; B29C 66/43121
  USPC .................... 53/134.2, 234, 375.9
  See application file for complete search history.

(56) References Cited

U.S. PATENT DOCUMENTS

| | | | |
|---|---|---|---|
| 2,348,201 A | 5/1944 | Barnett | |
| 2,362,459 A | 11/1944 | Barnett | |
| 2,385,229 A * | 9/1945 | Patterson | B65B 9/06 53/551 |
| 2,433,176 A * | 12/1947 | Van Epps et al. | B65B 51/146 156/581 |
| 2,469,972 A * | 5/1949 | Lowry et al. | B29C 65/224 493/379 |
| 2,481,554 A * | 9/1949 | Winstead | B29C 65/228 219/243 |
| 2,529,732 A * | 11/1950 | Howard | B65B 9/213 156/581 |
| 2,615,113 A * | 10/1952 | Frye | H05B 3/02 219/244 |
| 2,629,809 A | 2/1953 | Frye | |
| 2,650,183 A * | 8/1953 | Langer | B29C 66/81457 156/308.4 |
| 2,823,502 A | 2/1958 | Rambold | |
| 3,053,665 A | 9/1962 | Irmscher | |
| 3,566,573 A | 3/1971 | Irmscher | |
| 3,774,369 A | 11/1973 | Klar | |
| 4,085,568 A | 4/1978 | Focke et al. | |
| 4,495,745 A * | 1/1985 | Crescenzo et al. | B65B 51/14 53/77 |
| 4,676,051 A * | 6/1987 | Hoskinson et al. | B65B 61/12 53/562 |
| 4,731,974 A | 3/1988 | Billi | |
| 4,853,071 A | 8/1989 | Romagnoli | |
| 4,885,896 A | 12/1989 | Romagnoli | |
| 5,802,820 A | 9/1998 | Romagnoli | |
| 5,852,917 A | 12/1998 | Romagnoli | |
| 5,870,880 A | 2/1999 | Ramagnoli | |
| 5,893,256 A | 4/1999 | Ghirlandi | |
| 6,141,944 A | 11/2000 | Spatafora | |
| 6,499,273 B1 | 12/2002 | Marzocchi | |
| 6,657,165 B1 * | 12/2003 | Makutonin et al. | B29C 66/91423 219/244 |
| 6,675,553 B2 | 1/2004 | Lohrey et al. | |
| 6,948,292 B2 | 9/2005 | Romagnoli | |
| 8,202,079 B2 | 6/2012 | Litzenberg et al. | |
| 10,640,251 B2 | 5/2020 | Campagnoli et al. | |
| 10,765,562 B2 | 9/2020 | Piantoni et al. | |
| 11,299,304 B2 | 4/2022 | Lambertz et al. | |
| 11,577,474 B2 * | 2/2023 | Hishinuma | B65B 51/14 |
| 2002/0117248 A1 * | 8/2002 | Basque | B29C 65/222 156/64 |
| 2002/0139086 A1 | 10/2002 | Ghirlandi | |
| 2002/0139087 A1 | 10/2002 | Ghirlandi | |
| 2004/0226263 A1 | 11/2004 | Romagnoli | |
| 2011/0232229 A1 | 9/2011 | Rea et al. | |
| 2012/0085749 A1 * | 4/2012 | Wheeler | B65B 51/10 219/542 |
| 2013/0105279 A1 | 5/2013 | Ramirez | |
| 2017/0233120 A1 | 8/2017 | Spatafora et al. | |
| 2017/0240306 A1 | 8/2017 | Spatafora et al. | |
| 2019/0071199 A1 | 3/2019 | Cassoli et al. | |
| 2020/0346798 A1 | 11/2020 | Lambertz et al. | |

FOREIGN PATENT DOCUMENTS

| | | |
|---|---|---|
| CN | 1483645 A | 3/2004 |
| CN | 1556010 A | 12/2004 |
| CN | 103402875 A | 11/2013 |
| CN | 104245533 A | 12/2014 |
| CN | 105329693 A | 2/2016 |
| CN | 107074384 A | 8/2017 |
| CN | 107521760 A | 12/2017 |
| CN | 107848644 A | 3/2018 |
| CN | 208199001 U | 12/2018 |
| CN | 109641703 A | 4/2019 |
| CN | 208790071 U | 4/2019 |
| CN | 210618667 U | 5/2020 |
| DE | 3837118 A1 | 5/1990 |
| DE | 102007011060 A1 | 9/2008 |
| DE | 102018101570 A1 | 7/2019 |
| EP | 1268161 A1 | 1/2003 |
| EP | 1384664 A1 | 1/2004 |
| EP | 1795331 A1 | 6/2007 |
| EP | 1871670 A2 | 1/2008 |
| EP | 1731295 B1 | 3/2008 |
| EP | 2231479 B1 | 8/2011 |
| EP | 2681119 B1 | 12/2014 |
| EP | 3578483 A1 | 12/2019 |
| JP | S49-012259 U | 2/1974 |
| JP | S53-158761 U | 12/1978 |
| JP | S53158761 U | 12/1978 |
| JP | S55-60292 A | 5/1980 |
| JP | S55060292 | 5/1980 |
| JP | S55-124979 A | 9/1980 |
| JP | S57149797 | 3/1981 |
| JP | S59-54293 U | 4/1984 |
| JP | S63-107542 U | 7/1988 |
| JP | 2011079581 A | 4/2011 |
| JP | 2011246199 A | 12/2011 |
| JP | 2012511481 A | 5/2012 |
| JP | 2017114537 A | 6/2017 |
| WO | 0017055 A2 | 3/2000 |
| WO | 0162600 A1 | 8/2001 |
| WO | 200162600 A1 | 8/2001 |
| WO | 2009101686 A | 8/2009 |
| WO | 2010013206 A2 | 2/2010 |
| WO | 2012117308 A1 | 9/2012 |
| WO | 2018015917 A1 | 1/2018 |

OTHER PUBLICATIONS

Chinese Office Action issued in CN Application No. 202010372142.6 dated Jul. 15, 2021 with English translation (17 pages).
European Search Report issued in EP Patent Application No. 20171836.8 dated Sep. 10, 2020 (10 pages).
Extended European Search Report issued Jan. 13, 2020 in European Patent Application No. 19172261.0 (10 pages).
English translation of Japanese Office Action issued in JP Application No. 2020-081014 dated Jul. 16, 2021 (4 pages).
English translation of Japanese Office Action issued in JP Application No. 2020-081017 dated Oct. 8, 2021 (7 pages).
English translation of Japanese Office Action issued in JP Application No. 2021-141170 dated Nov. 4, 2021 (4 pages).
Japanese Office Action and Translation for Japanese Patent Application No. 2021-141170, dated Mar. 18, 2022.
European Search Report issued in European Patent Application No. 20193603 dated Feb. 10, 2021 (2 pages).
"CN Office Action from Related Matter 202111005431.3", dated Nov. 25, 2022, 8 pgs.

* cited by examiner

DEVICE FOR MANUFACTURING A POUCH ACCOMMODATED IN A WRAPPING

CROSS REFERENCE TO RELATED APPLICATIONS

This application claims benefit of priority pursuant to 35 U.S.C. § 119(a) of European patent application no. 20193603.6 filed Aug. 31, 2020, which is hereby incorporated herein by reference in its entirety.

FIELD

The present invention relates to a devices and methods for manufacturing a packaging unit comprising a pouch containing a brewable material provided in a typically aroma-tight wrapping.

BACKGROUND

A corresponding device with the features from the preamble is known from EP 2 231 479 B1. In this previously known device, the pouch is first placed in a wrapping station between opposite legs of a wrapping material supplied as a flat web. The pouch is placed on the web, which is folded around the pouch and cut off from a wrapping material supplied so that a piece of wrapping material of prefabricated length accommodates the pouch within it. By folding the wrapping material, an edge of the wrapping of the pouch is already formed. However, there is a need to form a U-shaped seal seam so that the wrapping is circumferentially closed around the pouch and an aroma-tight package of the brewable material within the pouch can result.

This brewable material is usually tea or other infusible material of dried powder or leaves, the quality and taste of which may be affected by environmental influences so that the previously mentioned aroma-tight packaging may be necessary. This also applies to the present invention.

In the aforementioned prior art, the U-shaped sealing seam is formed by a sealing device which has a plurality of sealing units on the outer circumferential surface of a carousel, each of which has sealing jaws which can be pivoted towards one another, which receive the wrapping together with the pouch and are closed in the course of a stepwise rotary movement of the carousel in order to seal the U-shaped edges of the wrapping by welding during the rotary movement of the carousel and to deliver the thus closed wrapping to another station.

BRIEF SUMMARY OF THE DISCLOSURE

This embodiment is based on the consideration that, in relation to other stations of the previously known device, the sealing of the pouch in the wrapping by forming weld seams requires a longer dwell time in the sealing station than in the previous stations. Thus, the individual work steps in the sealing station can be divided in time by rotating the carousel without interrupting or disturbing the cycle time of the entire device.

For the effective sealing of the wrapping, in particular by way of welding, it is necessary to bring the wrapping with its edges between the sealing jaws, to place the sealing jaws against the wrapping, to introduce a sufficient amount of heat into the wrapping in order to melt it in such a way that the mutually abutting webs of the wrapping melt and weld together. Due to the heat applied and the necessary cooling time, this seal is not immediately stable so that the packaging unit consisting of the pouch and the wrapping can usually only be further processed after a certain cooling time has been observed.

Since the device for manufacturing the packaging unit is a device for the mass production of consumables, it is important to have a fast cycle time and an economical production of the packaging unit.

The present invention aims to provide a device of the type described above which allows faster and thus more economical manufacturing of a pouch wrapped in an aroma-tight wrapping.

In order to solve this problem, the present disclosure provides a device for manufacturing a pouch containing a brewable material accommodated in a wrapping, comprising a pouch manufacturing device adapted to manufacture a pouch containing brewable material, and a sealing station with jaw elements forming opposing sealing surfaces acting on the wrapping from opposite sides for sealing the pouch, wherein at least one of the jaw elements forms a trough-shaped recess below the sealing surface, in which a helically laid heating conductor is accommodated.

In the solution according to the invention, the jaw element has a trough-shaped recess below the sealing surface. The bottom of the trough-shaped recess is formed by a surface section of the jaw element which forms the sealing surface. Opposite to this, the trough is usually open. In any case, the trough-shaped recess accommodates a helically laid heating conductor.

In this respect, the proposal according to the invention differs from the previously known prior art. Nowadays, jaw elements of a sealing station of the aforementioned type have a bore which extends parallel to the sealing surface and accommodates a cylindrical heating cartridge. This heating cartridge is inserted into the bore together with a heat-conducting paste. The previously known solution is disadvantageous with regard to the desired homogeneity of the heat on the sealing surface. Due to the system, the heat output of the heating cartridge is limited so that the heat output is not always sufficient for rapid heating of the wrapping during welding.

In the solution according to the invention, the heating conductor is laid helically in the trough. The heating conductor comprises a plurality of helically laid ring segments arranged one behind the other along an axis. In this context, a shape is preferred in which the ring segments each have the same diameter so that the trough can be configured with a uniform height. Preferably, only one single heating conductor is provided in the trough, which introduces the entire heat output into the respective jaw element.

It should be noted that the jaw element is usually U-shaped to form the previously mentioned U-shaped weld seam. According to a particular feature of the present invention, the jaw element and the trough-shaped receptacle are preferably L-shaped with a longitudinal leg and a transverse leg. The jaw element is preferably also formed in an L-shape. The heating conductor has a longitudinal helix and a transverse helix extending at right angles to said longitudinal helix. The two helices merge directly into one another. This L-shaped configuration of the heating conductor is achieved by appropriate laying of the helices and bending of the heating conductor. In this context, a shape is preferred in which the heating conductor is merely bent, but not kinked. The heating conductor is usually deformed with a radius that is not smaller than the radius of the individual helices. The longitudinal helix usually covers the transverse helix. As an extension of the longitudinal axis of the longitudinal helix or the longitudinal axis of the transverse helix, there is also a length section of the corresponding other helix. Thus, sufficient heating is introduced into the corner region of the L-shaped jaw element to melt the wrapping. The same applies to the arrangement of the helically laid heating conductor in the case of a U-shaped jaw element.

According to a preferred further development of the present invention, two helices are arranged next to each other in the trough-shaped recess. These helices are usually the transverse helices, i.e. those helices which, in the case of an L-shaped jaw element, are inserted in the trough section recessed in the transverse leg of the jaw element. In the case of a U-shaped recess, the two helices arranged next to each other are accommodated in a central base which connects the two longitudinal legs of the jaw element to each other and spaces them apart from each other. The present invention is obviously not limited to jaw elements formed in an L-shape. In such jaw elements, two jaw elements are provided on opposite sides of a sealing plane, which can be pivoted relative to one another in order not only to open the sealing jaws by a pivoting movement, but additionally to create more space between the longitudinal legs for removing the aroma-tight packaging unit or for inserting the wrapping into the sealing plane and between the jaw elements before sealing. In a U-shaped jaw element, one jaw element is provided on each side of the sealing plane. The jaw elements can usually only be pivoted about one or more axes that run parallel to each other.

According to a further preferred configuration of the present invention, at least two thermocouples are introduced into the trough-shaped recess. Two thermocouples are preferably provided for each jaw element and/or each individual heating conductor. One of the thermocouples is usually assigned to the sealing surface and detects its actual temperature for controlling the heating power. The other thermocouple can be provided in the same way. As a result, redundancy is increased and the jaw element can continue to be used to control the heating conductor even if one of the thermocouples fails. Preferably, however, the other of the thermocouples is assigned to the heating conductor and detects its actual temperature. As an excessive-temperature thermocouple, it detects a possible overheating of the heating conductor and is connected data-wise to a control system assigned to the heating conductor such that, in the event of overheating, energization of the heating conductor is suspended, preferably an error message is output, and operation is interrupted.

In this context, the control system can be adapted such that, in the event of failure of one of the thermocouples, the other thermocouple can be used to control the heating conductor.

According to preferred further developments, the heat transfer between the heating conductor and the jaw element is improved: For this purpose, the jaw element preferably consists of a metallic material with good thermal conductivity, in particular a steel with good thermal conductivity. Such a steel is, for example, chromium-nickel steel. The metallic material forming the jaw element should have a thermal conductivity of at least 21 W/mK. The trough-shaped recess is made from this solid material by milling. The bottom of the recess is formed to match the curvature of the helically laid heating conductor. In the concave trough of the jaw element formed in this way, the individual helices of the heating conductor are in direct heat-conducting contact with the surface of the jaw element with a wrapping angle of at least 160°, preferably 180°. This provides a short heat-conducting path between the heating conductor and the sealing surface. The smallest distance between the concave trough and the sealing surface is preferably no more than 9 mm. After the helically laid heating conductor has been inserted into the trough-shaped recess, the same is filled with a thermally conductive compound. This is preferably a soldering compound which is introduced in molten form into the trough-shaped recess to fill any remaining free spaces.

According to a preferred further development of the present invention, the heating conductor is formed by a coaxial sheath heating conductor. In this sheath heating conductor, the predominant length of the heating conductor consists of a thin-walled, usually metallic tube, in which an electrically insulating material is filled, which surrounds a resistive heating conductor, which is located inside the tube. The insulating ceramic may be, for example, magnesium oxide or aluminum oxide. At each end of the tube, electrically insulating sleeves are inserted into the tube, whose thermal conductivity is generally lower than the thermal conductivity of the insulating ceramic. Thus, the respective ends of the heating conductor are relatively cold. These ends protrude from the trough-shaped recess and are preferably provided with a contact element of a plug connection for introducing the power current into the heating conductor.

BRIEF DESCRIPTION OF THE DRAWINGS

Further details and advantages of the present invention will be apparent from the following description of an embodiment in conjunction with the drawing. Therein.

Figure 1:
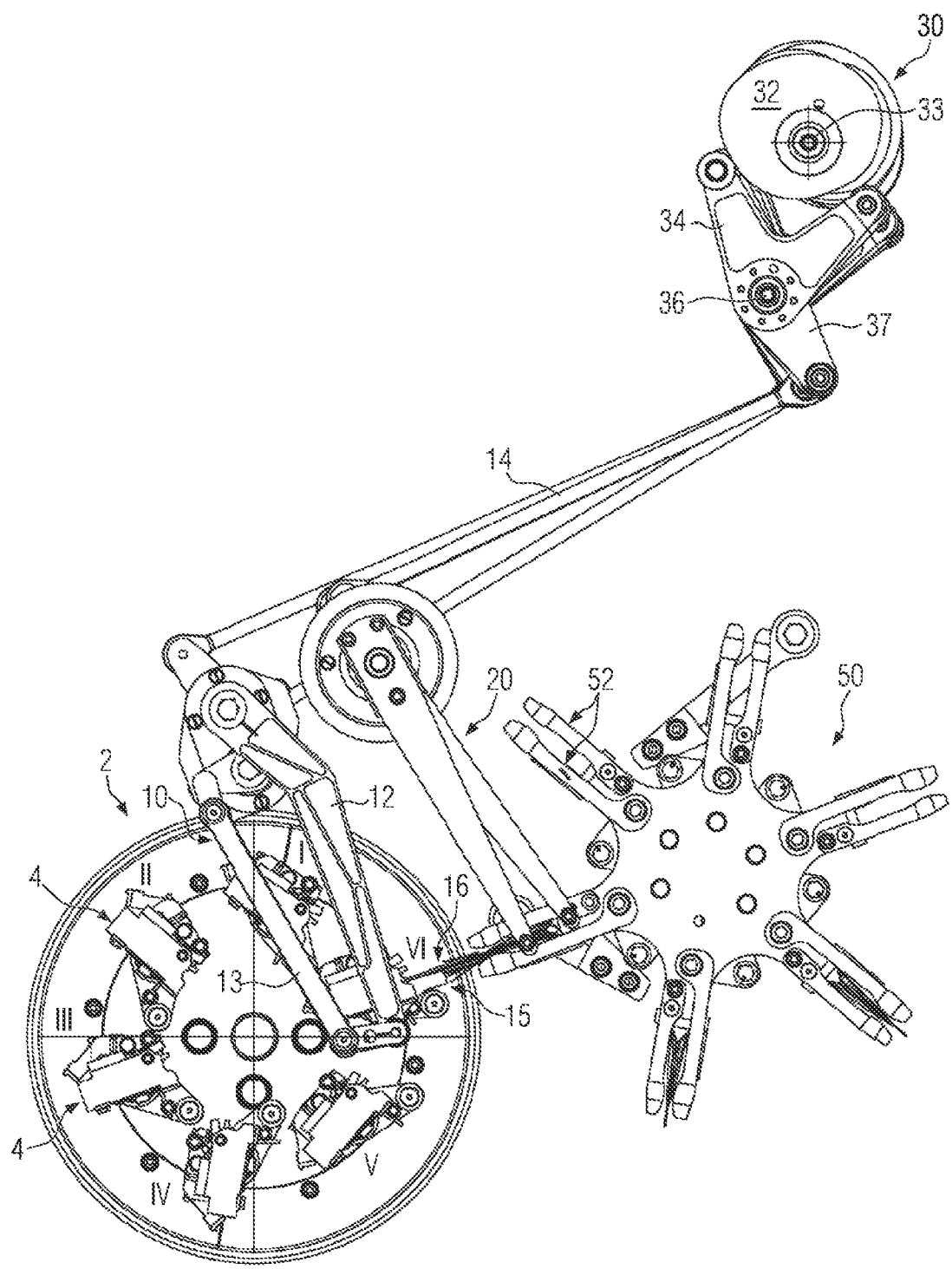
FIG. 1 shows a side view of essential parts of an embodiment of a device for manufacturing a wrapped pouch.

The embodiment shown in FIG. 1 has a pouch manufacturing device identified by reference sign 2 and a sealing station identified by reference sign 100.

The pouch manufacturing device 2 comprises a carousel with several receptacles 4 rotating about an axis for accommodating a water-permeable wrapping, which is formed to form the pouch containing a brewable material and is usually connected to a thread and a label. With regard to the individual stations and their configuration, reference can be made to the prior art, for example EP 2 231 479 B1 or WO 01/62600 A1. Reference signs I to VI in FIG. 1 identify various positions in which the receptacle 4 can be located in order to receive and process the various components of the finished pouch or the to-be-finished pouch. Elements acting in this process are not shown for the sake of clear representation. In position VI, the pouch is finished.

Figure 2:
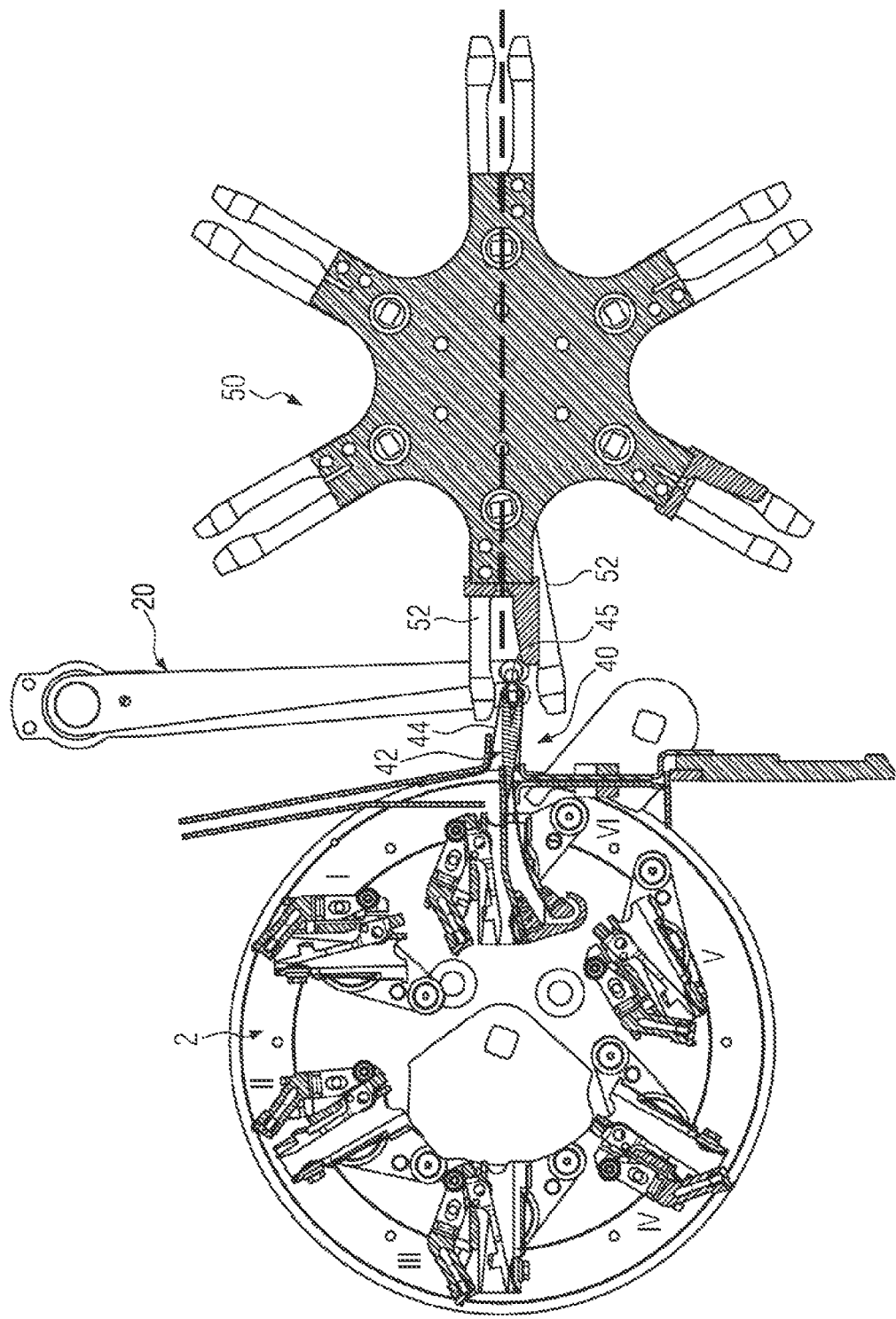
FIG. 2 shows an enlarged view of the pouch manufacturing device shown in FIG. 1 as the pouch and film are pushed out.

FIGS. 1 and 2 show elements of a pouch handling device identified by reference sign 10 and a wrapping material handling device identified by reference sign 20. The wrapping material of the embodiment shown is an aroma-tight film. Thus, in the description below, reference will be made to a film handling device 20. The pouch handling device 10 comprises two approximately parallel extending arms 12, 13, which are hingedly connected to each other and coupled to a common drive device 30 via coupling rods 14. This common drive device 30 has different cam discs 32 which are non-rotatably fixed on a common drive shaft 33 of the drive device 30 and are coupled to pick-ups 34 in which the outer circumferential surfaces of the cam discs 32 roll in each case, wherein the pick-ups 34 are each mounted pivotally on a common bearing axis 36 and are provided with a lever 37 which is hingedly connected to the associated coupling rod 14. The coupling rods 14 act on the arms 12, 13 via levers.

The drive device 30 actuates both the individual components of the pouch handling device 10 and the components of the film handling device 20. Thus, both handling devices 10, 20 are provided with a common drive and are forcibly synchronized.

As can be seen from FIG. 2, a film 40 shown schematically in FIG. 1 together with a pouch 42 are pushed out of the pouch manufacturing device 2 and towards a transport wheel 50, wherein a fold 45 formed by folding the material of the film 40 and formed between two legs 44 of the film 40 runs ahead and the pouch 42 runs behind. The film handling device 20 engages the edge of the film 40. The pouch 42 is pushed out from behind by actuating a clamping shoe 15 with a clamping spring 16 by moving the clamping shoe 15 together with the clamping spring 16 together with the front ends of the front and rear pouch handling arms 12, 13 radially away from the pouch manufacturing device 2. At the end of this movement, the pouch 42 is placed in the wrapped film 40 and clamped between clamping arms 52 of the transport wheel 50.

Figure 3:
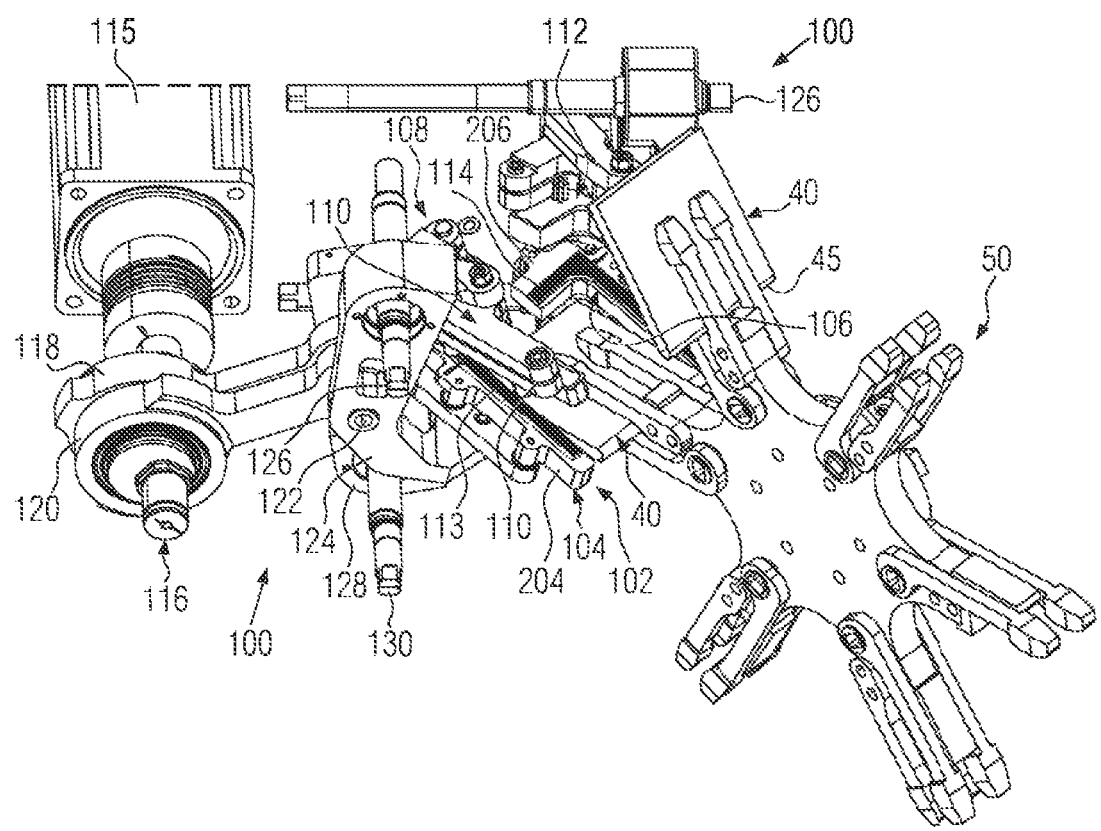
FIG. 3 shows a perspective top view of the sealing station of the embodiment according to FIG. 1 with the sealing jaws open.

The sealing station 100 has sealing jaws identified by reference signs 102 and 108, wherein the sealing jaw 102 shown at the bottom in FIG. 3 is formed from a first sealing jaw element 104 and a second sealing jaw element 106. Similarly, the upper sealing jaw 108 shown thereabove is formed of two jaw elements which are hereinafter referred to as counter jaw elements 110 and 112. As shown in particular in FIG. 3, each sealing jaw element 104, 106 is L-shaped in the top view and has a longitudinal leg 204 and a transverse leg 206 extending at right angles thereto. The longitudinal legs 204 each form a longitudinal seal by which the opposite legs 44 are joined at their longitudinal side. The two transverse legs 206 together form a sealing surface of each of the sealing jaws 102, 108, which is adapted to form a transverse seal and produce it on the film 40 so as to seal the transverse side of the film material opposite the fold 45. The longitudinal seals and the transverse seals allow the interior of the film package to be hermetically sealed. The fourth side is sealed by the fold 45. Each of the jaw elements 104, 106, 110, 112 forms a raised L-shaped sealing surface 113, 114.

The sealing jaw element 104 and the counter jaw element 110 are driven by a common drive 115 in the form of a servomotor. For this purpose, connecting rods are provided eccentrically to a drive shaft 116 of the drive 115, of which the connecting rod provided adjacent to the drive 115 is associated with the counter jaw element 110 and is accordingly hereinafter designated as the counter jaw connecting rod 118, and the other connecting rod, which is provided on the side of the counter jaw connecting rod 118 opposite to the drive 115, is designated and identified as the sealing jaw connecting rod 120. The sealing jaw connecting rod 120 is associated with the sealing jaw element 104.

This sealing jaw connecting rod 120 is freely rotatable and eccentrically mounted on the drive shaft 116. The other end of the sealing jaw connecting rod 120 is hingedly attached at a pivot point identified by reference sign 122 to a sealing jaw pivot arm 124, which carries the sealing jaw element 104 at one end and is pivotally mounted at its other end about a pivot axis 126, hereinafter identified as the sealing jaw pivot axis, which is connected to an independent drive (not shown).

In a corresponding manner, the counter jaw connecting rod 118 is pivotally connected to a counter jaw pivot arm 128 which supports the counter jaw element 110 and is pivotally mounted at its opposite end on a counter jaw pivot axis 130.

As is apparent from the foregoing description, toggle levers are provided for each of the first and second pairs of jaw elements 104, 110; 106, 112, wherein the toggle lever comprises the sealing jaw connecting rod 120 in addition to the jaw element 104 and the toggle lever comprises the counter jaw connecting rod 118 in addition to the counter jaw element 110. In this context, the two connecting rods 118, 120 are rotatably mounted about and supported by the common drive shaft 116. They are mounted eccentrically to this drive shaft 116. However, the eccentrics are angularly offset from each other. Said toggle levers force a pivoting movement on the jaw or counter-jaw elements 104; 110 during a rotational movement of the associated drives 115, within the framework of which the L-shaped jaw elements 104, 106 or the counter-jaw elements 110, 112 approach each other to form a U-shaped sealing surface, formed by the two L-shaped sealing surfaces 113, 114, and clamp the film 40 between them to form a U-shaped weld seam.

Figure 4:
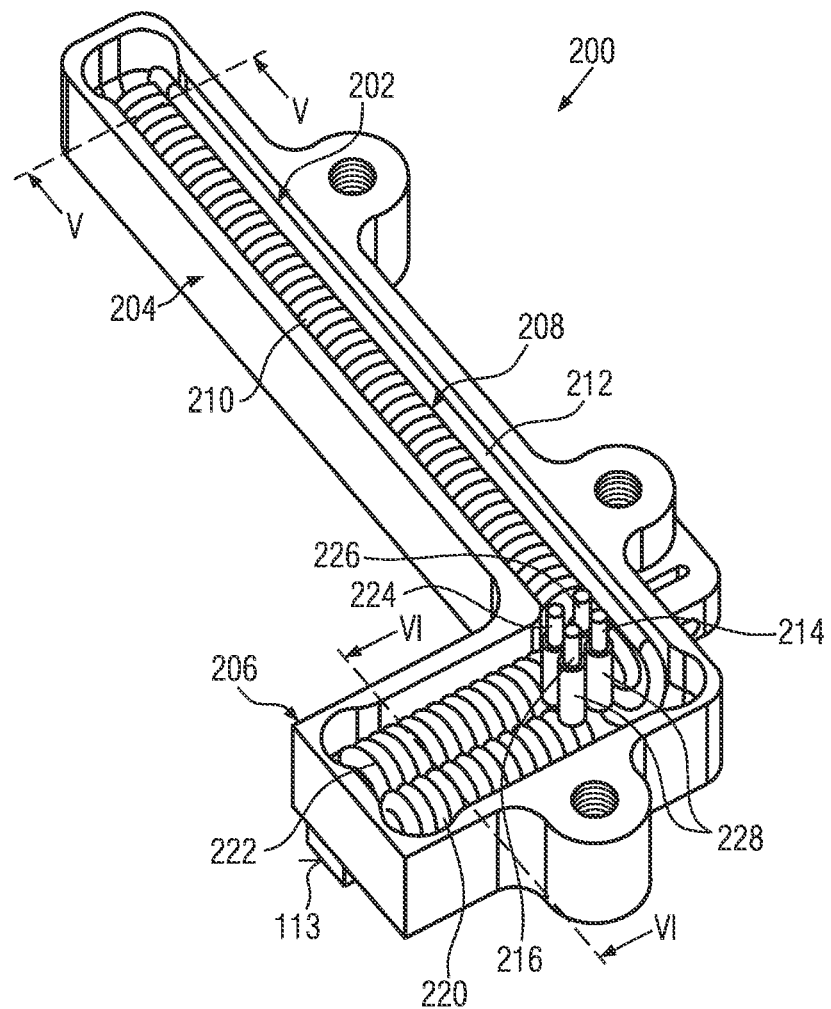
FIG. 4 shows a top perspective view of the lower side of an embodiment of a jaw element.

FIG. 4 shows a perspective top view of a not yet filled jaw element 200 corresponding to the jaw element 104 according to FIG. 3 with a trough-shaped recess 202, which is L-shaped and forms a longitudinal leg 204 and a transverse leg 206. Thus, an L-shaped basic shape of the trough-shaped recesses 202 is obtained.

Reference sign 208 identifies a heating conductor which is configured as a coaxial sheath heating conductor and is inserted helically into the trough-shaped recess 202. In the region of the longitudinal leg 204, only one helix is arranged, which extends essentially over the entire length of the longitudinal leg 204, wherein the end of the heating conductor 208 projecting from the free end of this longitudinal helix 210 is led back into the corner region of the L-shaped jaw element 200 via a conductor section 212 extending in a straight line and is led out there to form a first connection element 214. Directly adjacent to this is a second connection element 216, which is formed by the other end of the heating conductor 208 and initially merges into a first transverse helix 220, which is laid up to the free inner end of the transverse leg 206 and there merges into a second transverse helix 222, which is led up to the corner region of the jaw element 200. There, the central longitudinal axis of the longitudinal helix 210 intersects with turns of the second transverse helix 220. The second transverse helix 220 extends with its last turn approximately up to the outer circumferential surface of the longitudinal helix 210. In other words, the last turn is lying next to the conductor section 212 extending in a straight line. Thus, the last turn of the second transverse helix 220 extends up to an inner surface defining the trough-shaped recess 202 on the outer side thereof, the inner side being directed towards the a transverse leg 206.

Near the corner area and directly adjacent to the two connection elements 214, 216, two thermocouples 224, 226 are provided, of which the thermocouple identified by reference sign 224 extends to the bottom of the trough-shaped recess 202 in order to determine the actual temperature at the sealing surface 113, and the other thermocouple 226 is arranged between the two transverse helices 220, 222 and ends at the height of the same. This second thermocouple 226 serves to check the actual temperature of the heating conductor 208.

The thermocouples 224, 226 and the two connecting elements 214, 216 are each passed through ceramic sleeves 228 which, after the helically laid heating conductor 208 has been inserted, are surrounded by and materially bonded to a solder compound which is filled in molten form into the trough-shaped recess 202 to improve heat conduction between the heating conductor 208 and the jaw element 200.

Figure 5:
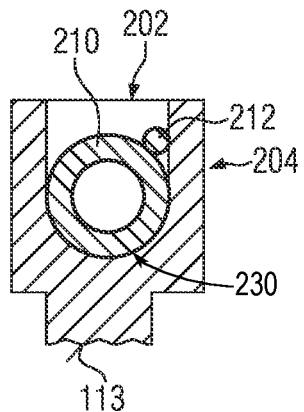
FIG. 5 shows a cross-sectional view along the line V-V according to FIG. 4.
Figure 6:
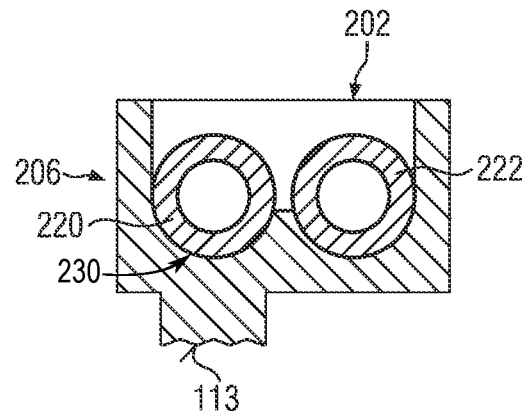
FIG. 6 shows a cross-sectional view along line VI-VI according to FIG. 4.

FIGS. 5 and 6 show the configuration of the bottom of the trough-shaped recess 202. There, the bottom is formed as a trough-shaped depression 230, the concave curvature of which is adapted to the radius of the helices of the heating conductor 208. The longitudinal leg 204 has a single corresponding depression 230. The transverse leg 206 has two such depressions for receiving one of the transverse helices 220, 222, respectively.

Figure 7:
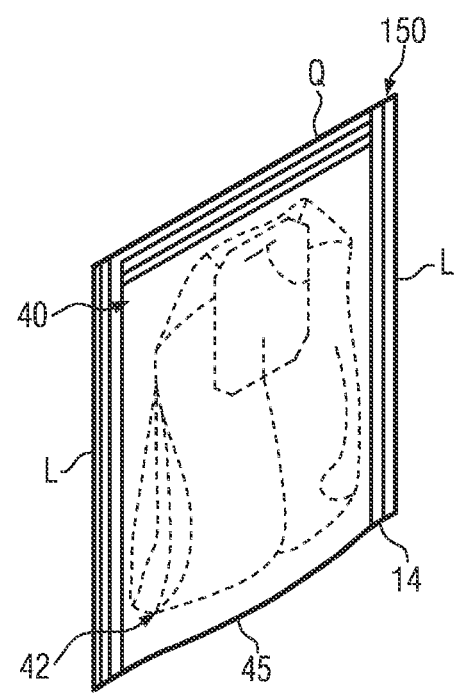
FIG. 7 shows a top view of a packaging unit consisting of a pouch and a film.

FIG. 7 illustrates the package manufactured in the manner described above, consisting of a wrapping identified by reference sign 150, which as a circumferential wrapping accommodates the pouch 42 illustrated in dots with thread and label therein and encloses it in an aroma-tight manner. The wrapping 150 has a first broad side which is closed by the fold 45. Longitudinal seals L extend at right angles from this fold 45. At the end of these longitudinal seals L is a transverse seal Q which runs parallel to the fold 45. The longitudinal and transverse seals L, Q merge or penetrate each other.

REFERENCE SIGN LIST 2 pouch manufacturing device
4 receptacle
10 pouch handling device
12 front pouch handling arm
13 rear pouch handling arm
14 coupling rod
15 clamping shoe
16 clamping spring
20 film handling device
30 drive device
32 cam disc
33 drive shaft
34 pick-up
36 bearing axis
37 lever
40 film
42 pouch
44 leg
45 fold
50 transport wheel
52 clamping arm
100 sealing station
102 lower sealing jaw
104 jaw element
106 jaw element
108 upper sealing jaw
110 counter jaw element
112 counter jaw element
113 L-shaped sealing surface
114 L-shaped sealing surface
115 drive
116 drive shaft
118 counter jaw connecting rod
120 sealing jaw connecting rod
122 pivot point
124 sealing jaw pivot arm
126 sealing jaw pivot axis
128 counter jaw pivot arm
130 counter jaw pivot axis
150 wrapping
200 jaw element
202 recess
204 longitudinal leg
206 transverse leg
208 heating conductor
210 longitudinal helix
212 conductor section extending in a straight line
214 first connection element
216 second connection element
220 first transverse helix
222 second transverse helix
224 thermocouple
226 thermocouple
228 ceramic sleeve
230 depression
L longitudinal seal
Q transverse seal
I-VI position of the receptacle 4
L longitudinal seal
Q transverse seal
I-VI position of the receptacle 4

What is claimed is:

1. A device for manufacturing a pouch containing a brewable material accommodated in a wrapping, comprising a pouch manufacturing device adapted to manufacture a pouch containing brewable material, and a sealing station with jaw elements forming opposing sealing surfaces acting on the wrapping from opposite sides for sealing the pouch, wherein at least one of the jaw elements forms a trough-shaped recess below the sealing surface, in which a helically laid heating conductor is accommodated,
    in that the trough-shaped recess has an open top and a bottom,
    in that the bottom of the trough-shaped recess is formed by a surface section of the at least one jaw element which forms the sealing surface,
    in that the bottom of the trough-shaped recess defines a concave depression formed to match the curvature of the helically laid heating conductor,
    in that the bottom of the trough-shaped recess is closer to the sealing surface than the open top of the trough-shaped recess, and
    in that a smallest distance between the concave depression and the sealing surface is less than a distance between the open top of the trough-shaped recess and the sealing surface.

2. The device according to claim 1, wherein the at least one jaw element and the trough-shaped recess are L-shaped with a longitudinal leg and a transverse leg, and in that the heating conductor forms a longitudinal helix and a transverse helix which are arranged at right angles to one another and directly adjoin one another.

3. The device according to claim 2, wherein two transverse helices are arranged next to each other in the trough-shaped recess.

4. The device according to claim 1, wherein at least two thermocouples are introduced into the trough-shaped recess.

5. The device according to claim 1, wherein the trough-shaped recess is filled with a solder compound.

6. The device according to claim 1, wherein the jaw element is made of a steel with thermal conductivity of at least 21 W/m K.

7. The device according to claim 1, wherein the heating conductor is formed by a coaxial sheath heating conductor.

8. The device according to claim 1, wherein two helices are arranged next to each other in the trough-shaped recess.

* * * * *